(No Model.) 4 Sheets—Sheet 2.

H. W. MORGAN.
BOX MACHINE.

No. 496,431. Patented May 2, 1893.

Witnesses:
Harry B. Rohrer
Alex Stewart

Inventor:
Harry W. Morgan
By Church & Church
Attys.

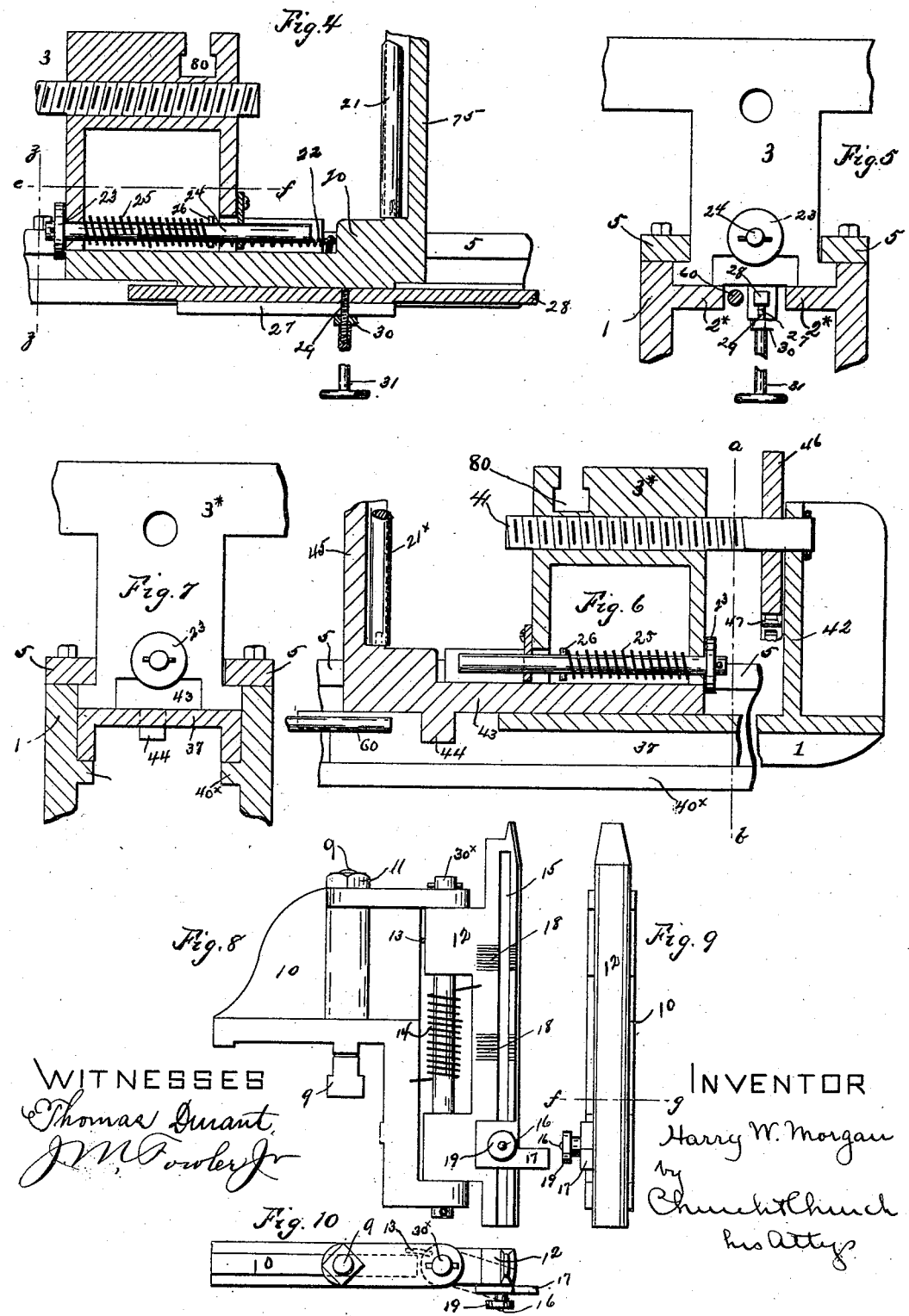

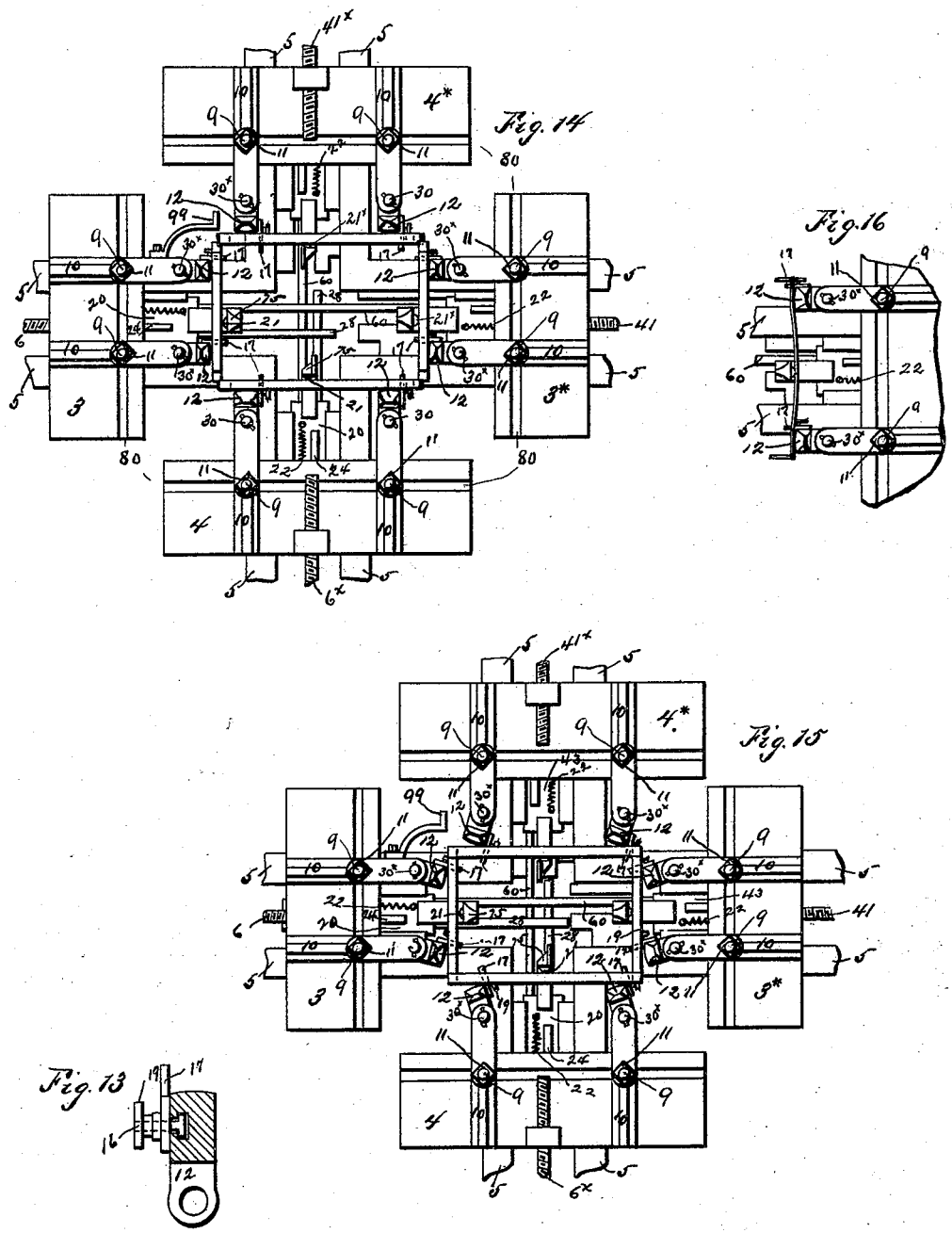

UNITED STATES PATENT OFFICE.

HARRY W. MORGAN, OF ROCHESTER, NEW YORK.

BOX-MACHINE.

SPECIFICATION forming part of Letters Patent No. 496,431, dated May 2, 1893.

Application filed May 16, 1892. Serial No. 433,194. (No model.)

*To all whom it may concern:*

Be it known that I, HARRY W. MORGAN, of Rochester, in the county of Monroe and State of New York, have invented certain new and useful Improvements in Box-Machines; and I do hereby declare the following to be a full, clear, and exact description of the same, reference being had to the accompanying drawings, forming a part of this specification, and to the reference-numerals marked thereon.

My present invention relates to machines for readily assembling or putting together that class of boxes in which the sides and ends are secured together by interlocking tongues and grooves, though readily adapted for entering and firmly securing tongued boards or strips, and it has for its object to provide a machine that is simple in its construction and which will cause the interlocking tongues on the boards or strips to be entered accurately and positively secured, the machine being capable of adjustment so as to prevent improper operation and to suit varying thicknesses of material, and to these and other ends it consists in certain improvements in construction and combinations of parts, all as will be hereinafter fully described and the novel features pointed out in the claims at the end of this specification.

Figure 1:
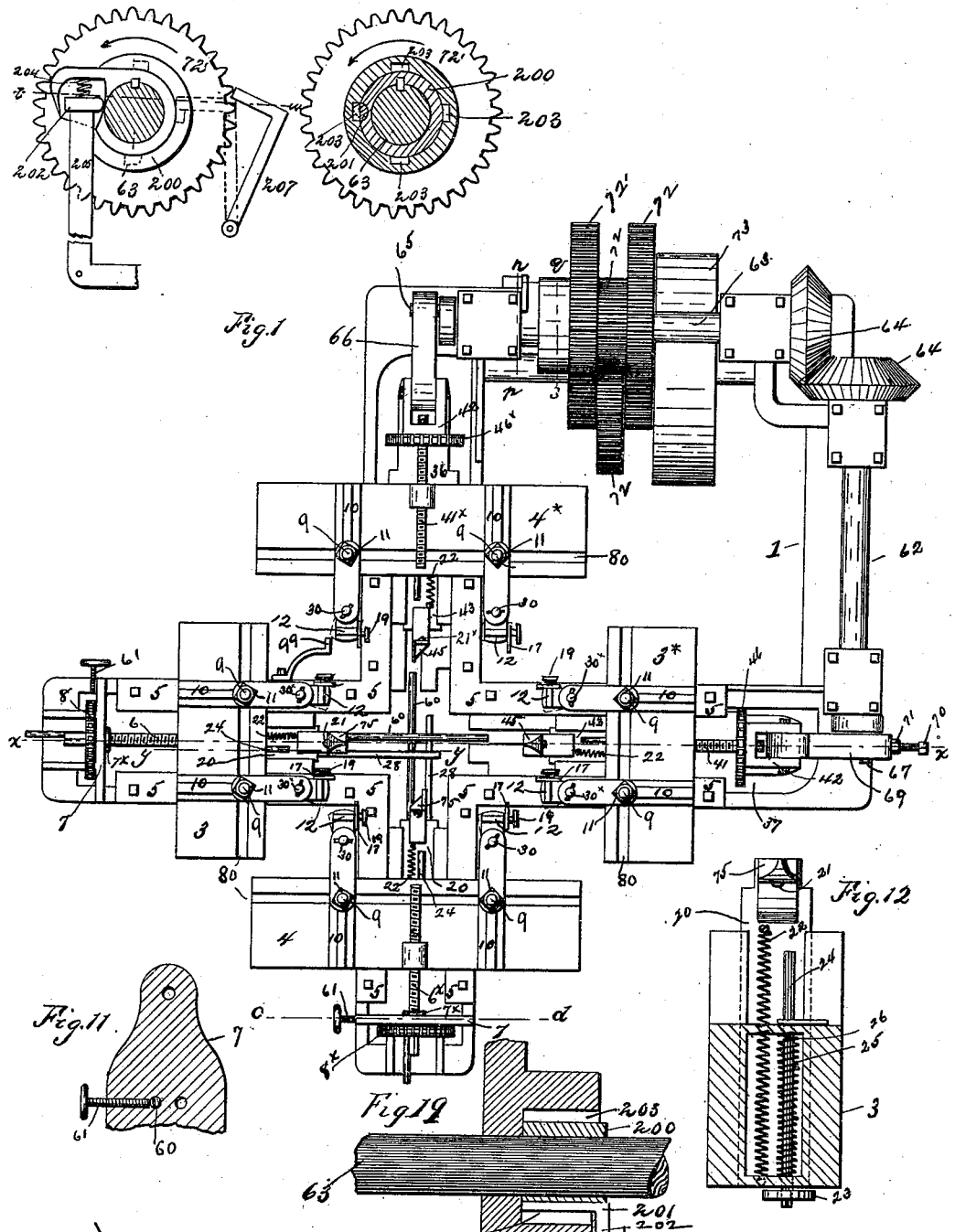
Figure 2:
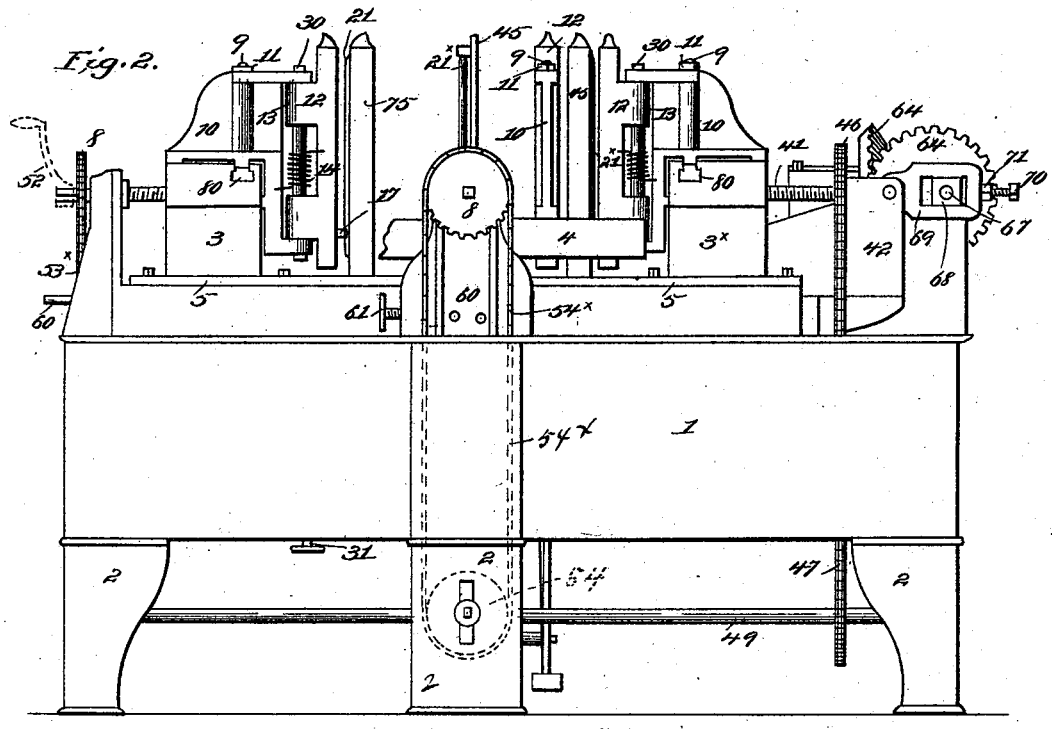
Figure 3:
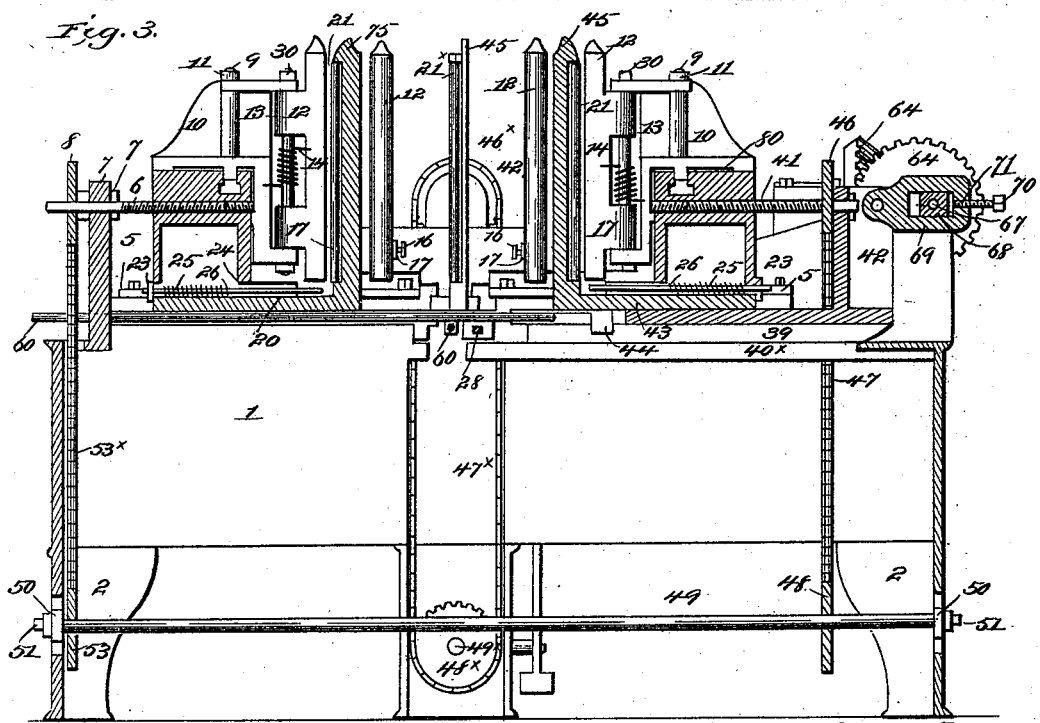

In the drawings: Figure 1 is a plan view of a machine constructed in accordance with my invention; Fig. 2, a side elevation of the same; Fig. 3, a longitudinal section on the line $x$—$x$ of Fig. 1; Fig. 4, an enlarged section on the line $y$—$y$ of Fig. 1; Fig. 5, a section on the line $z$—$z$ of Fig. 4; Fig. 6, an enlarged section of the slide shown to the right in Fig. 3; Fig. 7, a section on the line $a$—$b$ of Fig. 6; Fig. 8, an enlarged side view of one of the board-carriers and its support removed from the slide; Fig. 9, a front view of said support; Fig. 10, a plan view of the same; Fig. 11, a section on the line $c$—$d$ of Fig. 1; Fig. 12, a horizontal section on the line $c$—$d$ of Fig. 4. Fig. 13 is a sectional view on the line $f$—$g$ of Fig. 9; Fig. 14, a plan view of the machine showing the first stage of the operation of making a box; Fig. 15, a similar view when the box is completed by the machine; Fig. 16, a similar view when making a box of thin material. Fig. 17 is a section on the line $r$—$p$ of Fig. 1; Fig. 18, a section on the line $q$—$s$ of Fig. 1, and Fig. 19, a section on the line $t$—$u$ of Fig. 17.

Similar reference numerals in the several figures indicate similar parts.

The main frame of the machine consists of a bed or casting 1 having supporting legs 2 and in its top are provided ways extending at right angles to each other and crossing at the center of the machine in which operate suitable slides or abutments adapted to carry the side and end pieces of the box to be put together. These slides are arranged in pairs set opposite and one of each pair is supported on a carriage which is movable toward and from the other (stationary) one during the operation of setting up the box and the two co-operating slides are adjustable and preferably simultaneously toward and from each other so that though the amount of the movement of the carriage is practically constant the distance between the two slides may be varied to operate on different sizes of boxes.

As the construction of the two stationary slides is identical excepting in a single instance, which will be described, and also as the movable slides are the same in construction a specific description of one of each will enable the machine to be readily understood.

Referring particularly to Fig. 1, the slides 3 and 4, shown at the bottom and left of said figure, are the ones termed "stationary," located directly opposite their corresponding movable slides 3* and 4* and are supported upon flanges 2* in the frame 1, being held in position by plates 5, or other suitable means.

On the main frame and at the ends of the ways for the stationary slides are arranged vertical extensions 7 through which pass adjusting screws 6, 6×, entering the slides and prevented from longitudinal movement by collars 7× and sprocket wheels 8, 8×, arranged on opposite sides of the extension. In the tops of the stationary slides are undercut grooves 80 adapted to receive the heads of bolts 9 passing up through brackets 10, two of which are arranged upon each slide, nuts 11 on the ends of the bolts serving to clamp the brackets securely to the slide when adjusted. The forward projecting portions of the brackets 10 are provided with vertical bearings in which are located rods or pins 30× and on these rods are journaled the board carriers 12 the latter being provided with two perforated lugs and with pins 13 adapted to engage the brackets 10 and limit the rotary motion of the carriers caused by the springs 14 encircling the rods and engaging at opposite ends the carriers and brackets. The outer faces of the carriers 12, which are preferably narrow are curved preferably on an arc struck from the center of the pin $30^\times$, the upper end being beveled slightly as shown in Fig. 8 and in one side it is provided with a longitudinal groove 15 in which operates a headed pin 16 carrying the plate 17 projecting forward of the carrier and serving as a support for the board, said plate being provided on the surface in contact with the side of the carrier with a series of notches or teeth adapted to co-operate with corresponding teeth 18 formed on the carrier and to be secured rigidly in position by means of a small nut 19 operating on the screw 16, as shown more particularly in Fig. 13.

The movement of the surface of the carriers laterally, is in a direction to cause the tongues of the board to engage readily with those of the co-operating board at the end without undue friction on the slide carrying it. The faces of the carriers are rounded concentric with their center of motion, so that when turned on their pivots, the plane of the face of the board will not be changed, and they are permitted an oscillatory movement rather than a rotary movement, on their center of rotation, so that the same surface acts on the board at every operation and they are thereby kept free from glue, as farther on explained.

Arranged in suitable recesses in the lower side of the slides 3 and 4 are board holders or pressers consisting of slides 20 arranged to hold the boards on the carriers and prevent inward movement of the central portions during the operation, having vertical portions 75 at their forward ends upon the inner sides of which are journaled small rollers 21; said vertical extensions being located about midway between the board carriers, two of which are provided upon each slide. These pressers are normally held retracted by means of springs 22 fastened to the rear of the stationary slides and their inward movement is arrested by the washers or collars 23 on the end of horizontal rods 24 normally pressed forward or toward the center of the machine by springs 25 stronger than springs 22 encircling the rods and arranged between the pins 26 thereon and the rear of the main slide. The under sides of the pressers 20 are provided with longitudinal slots 27 and apertures through which pass rods 28 extending toward the center of the machine and having secured to them threaded pins 29 engaged by nuts 30 having extended handles 31; said nuts being broader than the slots 27 and serving not only as a means for securing the rods 28 to the slides, but also, when loosened, as a means for operating said rods longitudinally through the medium of the extended handles 31, all as shown more particularly in Figs. 4 and 5.

The description thus far applies equally well to the two slides 3 and 4 excepting as to the direction in which the carriers 12 are capable of swinging movement, which movement as will be noted is governed by the stop pin 13.

Located in the guide ways in the main frame of the machine and opposite the stationary slides 3 and 4 are the co-operating slides 3* and 4*, the former being directly opposite the slide 3 and the latter opposite the slide 4 and excepting as to the means for operating the carriages on which said slides are secured and as to length (the slides 4 and 4* being used for the sides of oblong boxes, are longer) their construction is identical so that a description of one will suffice for both. These slides are mounted upon carriages 36 and 37 sliding on guide ways $40^\times$ in the main frame and are adjustable thereon by means of screws 41, $41^\times$, journaled in vertical extensions 42 of the carriage and prevented from longitudinal movement therein, said screws entering threaded perforations in the main carriages, so that by the adjustment the slides will be moved back and forth on the carriage as will be understood. The guides or supports $40^\times$ for the carriages are arranged in a lower plane than those for the slides 3 and 4 in order that the board carriers and pressers of each co-operating pair may be in substantially the same plane.

Secured to the upper sides of the slides 3* and 4* are brackets 10 carrying board carriers 12, the same as those on the stationary slides and arranged in their lower sides are pressers 43 corresponding to the pressers 20 in the stationary slides 3 and 4, but instead of providing the under side of the pressers 43 with slotted extensions they have depending lugs 44, as shown more particularly in Figs. 6 and 7. They are retracted however, by springs 22 and held against the washers or collars 23, as are the others, and in their vertical extensions 45 are journaled rollers $21^\times$ projecting toward the carriers 12 mounted on the slide.

Upon the screws 41 and $41^\times$ of each carriage are arranged sprocket wheels 46, $46^\times$, keyed or otherwise rigidly secured thereto and extending around said sprocket wheels are chains 47, $47^\times$, and also passing around corresponding sprockets 48, $48^\times$, arranged on shafts 49, $49^\times$, journaled in suitable boxes 50 arranged in the lower portion of the machine and adapted to be secured rigidly thereto by screws 51 or other suitable devices to permit the vertical adjustment of the shafts for the purpose of tightening the chains when desired. Upon the other ends of these shafts are corresponding sprocket wheels 53, 54, connected by chains $53^\times$, $54^\times$, with the sprockets 8, $8^\times$, on the screws 6, $6^\times$, of the corresponding stationary slides. The outer ends of the screws 6, $6^\times$, are squared so as to adapt them to receive a removable handle 52, as shown in dotted lines Fig. 2, and as said screws 6, 6×, and 41, 41×, of co-operating slides are provided with left and right hand threads, respectively, it will be seen that by operating one of them, motion will be communicated to the other through the chains and sprockets described and the co-operating slides will be adjusted toward or from each other depending of course upon the direction of movement.

Beneath the stationary slides 3 and 4 and projecting toward and extending past the center of the machine are gage-rods 60, the forward ends being adapted, when the movable slides are in their inmost position, to strike the lugs 44 on the lower side of the pressers 43 carried by the movable slides 3* and 4*; said rods being secured in position by set screws 61, as shown in Fig. 11.

Supported in suitable bearings in the main frame of the machine are two shafts 62 and 63 extending at right angles to each other and provided on their ends with intermeshing beveled gears 64, the shaft 63 having a crank pin 65 on its end connected by a link or pitman 66 with the carriage 36. The end of the shaft 62 is, however, provided with a crank pin 67 entering a block 68 sliding in a slotted link or pitman 69 pivoted to the carriage 37 and in the end of said link is a suitable adjusting screw 70 secured by a set nut 71, the object of this adjustable connection being to vary the time of the movement of this carriage 37 with relation to the movement of the other one, when desired, so as to insure the proper entering of the tongues and grooves of the sides and ends of the box as will be farther on explained.

Secured to one of the brackets 10 on the slide 3 is a broad gage or stop 99 with which the end of the board on slide 4× co-operates when the slides are in outward position but when the slides are moved inward, the board is released from the stop and is free to move lengthwise the proper distance to form the fastening as shown in Figs. 1 and 14.

When the machine is not in operation, the crank pins 65 and 67 are in outermost position holding the carriages outward and the shafts 62 and 63 may be rotated by any suitable means, as for instance, a train of gears 72 72′ operated from a belt pulley 73, as in Fig. 1, or any other desired. It is desirable to employ a clutch device of any preferred construction by the use of which the shafts may be given a half rotation, so as to stop with the carriages moved inward.

In Figs. 17, 18 and 19 I have shown a form of clutch which can be used with success in this machine,—63 indicating the shaft on which the crank pin 65 is secured, and 200 a sleeve splined to the shaft and on or over which the gear 72′, or a sleeve extension, runs loosely. This sleeve has a semi-circular groove in one side in which is located a half round pin or key 201, having an arm 202 at one end projecting parallel with the face of the gear, and the inside of the gear 72′ is provided with a series of recesses 203 adapted to be engaged by the pin 201 when the latter is turned to the position in dotted lines Figs. 17 and 18. The outer face of the pin 201 is concentric with the inside of the gear 72′ and when in the position in full lines Figs. 17 and 18 does not connect the sleeve and gear, but permits the latter to rotate freely. The sleeve 200 has an extension with a recess in which the arm 202 is located and a spring 204 bearing on the arm tends to turn the arm and pin so as to engage the sleeve and gear, if not retained.

205 indicates an arm pivoted on the main frame connected with the treadle 98 and normally held in line with the arm 202, holding the key out of engagement and the sleeve disconnected from the gear. When, however, the machine is to be operated, the arm 205 is removed, the spring turns the key so as to engage with one of the recesses 203 in the gear and rotate the shaft 63 a whole rotation until the arm 202 again engages the arm 205, when the machine is arrested with the slides in outward position. When it is desired to cause only a half rotation of the shafts, bringing the slides inward for the purpose of adjustment, a pivoted hook-shaped arm 207 is moved from the normal position in full lines Fig. 17 to the position in dotted lines, where it will engage the arm 202 of the key and disengage the latter from the gear in the same manner that arm 205 does, and by moving the arm 207 back again the rotation of the shaft may be completed and the slides moved again to outward position. This is only one form of clutch device and other equivalent devices may be used if desired.

The class of boxes to be set up or formed by this machine is composed of side and end pieces having tongued and grooved ends adapted to be forced tightly together to interlock and as usual to have glue applied to the ends for forming good joints and secure fastenings and as the pieces are of a standard length the machine being set for one size of boxes it will not require further change or adjustment until another size is to be made.

In order to set the machine for operation, the shafts 62 and 63 are given a half revolution moving the carriages and movable slides inward, then all the brackets 10 are adjusted on their slides so that they will be near the corners of the box, but will not touch each other when the box is being clamped, a standard box of the size to be formed is placed between the slides, the rollers on the pressers 20 and 43 being engaged with the inner faces of the side and end pieces and held by their springs 22 and the board supports 17 are adjusted to the proper height on the carriers 12, which is facilitated by the serrations 18 on the sides of the latter enabling the operator to readily locate all of them at the same height. The crank handle 52 is applied to the end of the screws 6, 6×, and rotated in a proper direction to cause the co-operating slides to approach each other until their carriers 12 are forced against the sides of the box tightly, the simultaneous movement of co-operating slides being caused by the sprockets and chains before described. Then the gage rods 60 in the main frame are moved toward the center of the machine until they abut against the lugs 44 on the pressers of the movable slides, when they are firmly secured by their set screws 61; the nuts 30 are loosened and the adjustable gage rods 28 in the pressers 20 are moved inward until their inner ends engage the ends of the movable carriages 36 and 37, and said nuts are again tightened. The machine having been thus adjusted for a box of a certain size the shafts 62 and 63 are rotated another half revolution and stopped, the carriages and their slides being then in outward position, as in Figs. 1 and 2, and ready for making boxes. In this instance the machine is set for oblong boxes, but it is evident that for making square boxes it is only necessary that the carriers on the slides 3 and 3* be set farther apart and the said slides adjusted the same distance apart as are the slides 4 and 4*. The operator now places the end boards of the box to be formed on the support 17 on the carriers 12 of slides 3 and 3* and places the side boards on the supports of the slides 4 and 4*, the board on the latter engaging the gage 99 on slide 3, the beveled ends of the carriers facilitating their ready introduction between them and the rollers 21 and 21$^\times$ on the pressers 20 and 43. The shafts 62 and 63 are now rotated and the carriages carrying the movable slides are moved toward the stationary slides, but their movement is so timed by the adjustment of the set screw 70 in the pitman 69 that the slide 4* will have moved its board away from gage 99 and far enough to engage the tongues on all the boards, the ends of the end boards (on slides 3 and 3*) being inside the tongues on the boards on slides 4 and 4*, so that the pressure will be first applied from slide 4* and the tongues on the end boards entered longitudinally preventing displacement, as shown in Fig. 14, and afterward the slides move together completing the clamping.

It will be noted that the parts of the box are movable toward the corner between the two stationary slides and that therefore the supports carrying the boards should move in this direction, which is provided for in my machine by pivoting the carriers 12 as shown, so that while they exert the necessary pressure on the boards, they allow them to move as shown in dotted lines in Figs. 1, 10 and 15, the rollers 21 and 21$^\times$ also permitting the necessary longitudinal movement of the boards without undue friction. These swinging oscillatory carriers I find particularly desirable for the further reason that as the tongues on the boards are usually dipped in glue, which oftentimes comes off on them, the rolling motion the carriers have on the boards squeezes the surplus glue out from between the surfaces and leaves them practically free and clean, so that there is no liability of the boards becoming marred by dried glue on the carriers or of the displacement or disarrangement of those subsequently applied to the carriers. As the pressure forcing the tongues on the boards, is applied near their ends they have a tendency to bow or bulge inward at the center making the sides or ends of the box curved and as the fastening is a tight one they are liable to remain in this condition and it is for the purpose of avoiding this and insuring boxes of proper shape that the gage rods 28 and 60 are employed for preventing the inward movement of the pressers 20 and 43. When the carriages 36 and 37 reach the limit of their inward movement the stationary gage rods 60 engage the lugs 44 on the pressers 43 and arrest the latter, holding the inner side of the board stationary and preventing its bulging, and at the same time the carriages 36 and 37 engage the gage rods 28 on pressers 20 and prevent movement of the latter insuring the formation of a box with rectangular sides. When, however, very thin boards are employed, simply arresting the inward movement of the pressers by the gage rods at the completion of the pressure will not suffice, as the boards will bend between the holders and the carriers and to obviate this and insure the proper operation the gage rods 28 and 60 are set a little farther inward than for thick boards, so that the holders will not only be arrested and prevented from moving away from the collars 23 that normally arrest them, but they and the collars will be moved backward (relatively) against the tension of the springs 25, the adjustment being such that though the boards may bend as indicated in Fig. 16, the ends of the boards will be engaged properly and a rectangular box be formed.

When the sides and ends of the box are put together and secured as described the carriages move outward again and the box can be removed and the lid and top nailed on in the usual manner. When the carriages move outward the one 37 moves last owing to the lost motion between the block in the pitman and the adjustable screw 70 on the latter. When boxes employing sliding tops or covers are to be made, as the sides or ends over which the cover moves must be shorter than the ones in which it slides, the adjustable supports 17 supporting the narrower boards may be readily moved up on their carriers 12 the proper distance and secured, thereby insuring the proper relation of the parts.

The boards can be placed on the slides very rapidly by the operator when using the machine, it only being necessary to have the board on slide 4* against the gage or stop 99 and to see that the other boards do not lap over the carriers too far.

Notwithstanding the fact that the sprocket wheels on the screws of the carriages are movable and those on the shafts 49, 49×, stationary, the chains have sufficient flexibility to insure the proper operation of the parts without displacement.

While I have termed the parts 12 board carriers, I wish to be understood as meaning the devices that carry or move the boards together and it is not absolutely essential that they support the boards entirely also, as other supports than the ones shown herein as mounted on the carriers could be employed.

The particular features which render this machine valuable and capable of performing the operations properly are those by which the ready and simultaneous adjustment of the carriers is secured; the movable board carriers; means for causing the proper entering of the tongues on the boards before they are clamped together; and the employment of pressers for holding the boards and preventing their bending, the parts capable of adjustment to operate properly with any size or shape of box.

It will be understood that boxes of any size can be formed on this machine by adjusting the slides and that the supports 17 can be moved toward the tops of the carriers 12 for supporting the sides of shallow boxes thus obviating the necessity of the operator putting his hand down between the slides.

The devices for causing the half and whole rotations of the operating shafts may be as shown or of the usual variety, such as are used in drop presses and similar machinery and operated by a treadle 98, shown in Fig. 3 the connections of which however, are not shown.

In the claims where I have used the term "slide" I do not desire to limit the invention to a part that necessarily slides unless it is specified as adjustable, the term being used to correspond with the one used in the specification to designate generally the parts 3, 3*, 4, and 4*.

I claim as my invention—

1. In a box machine embodying relatively movable cooperating slides, the combination with one of the slides, of the board carriers pivoted thereon each carrier having a rounded face engaging a single board, substantially as described.

2. In a box machine embodying relatively movable cooperating slides, the combination with one of the slides, of the board carriers pivoted thereon to turn at right angles to the opposing slide and both engaging a single board, substantially as described.

3. In a box machine embodying relatively movable cooperating slides, the combination with one of the slides, of the board carriers pivoted thereon each carrier having a rounded face and both engaging the same board and the springs turning the carriers in one direction on their pivots, substantially as described.

4. In a machine for assembling tenoned boxes, the combination with a movable slide for moving one of the boards having two board carriers pivoted thereon to turn at an angle to the plane of movement of the slide, and both operating on the same board substantially as described.

5. In a machine for assembling tenoned boxes the combination with a movable slide, of two board carriers pivoted thereon and movable at an angle to the movement of the slide and board supports mounted on the carriers, substantially as described.

6. In a box machine, the combination with the four cooperating slides relatively movable toward each other in pairs and each operating on a single board, of the board carriers pivoted to turn laterally thereon, the carriers of each pair being capable of movement on their pivots in the same direction, substantially as described.

7. In a box machine, the combination with the four cooperating slides relatively movable toward each other in pairs, of the board carriers pivoted to turn laterally thereon having rounded faces against which the boards rest, the carriers of each pair being capable of movement on their pivots in the same direction, substantially as described.

8. In a box machine, the combination with the four cooperating slides relatively movable toward each other in pairs, of the oscillating board carriers pivoted to turn laterally thereon having rounded faces against which the boards rest, the carriers of each pair being capable of movement on their pivots in the same direction, substantially as described.

9. In a box machine, the combination with the four cooperating slides or abutments each operating on a single board relatively movable toward each other in pairs, of the board carriers pivoted to turn laterally thereon and the board supports on said carriers, the carriers of each pair being capable of movement on their pivots in the same direction substantially as described.

10. The combination with four cooperating slides relatively movable toward each other in pairs and each operating on a single board, of two carriers mounted on each slide and adjustable toward and from each other whereby different sized boxes may be formed, substantially as described.

11. The combination with the stationary slide, the movable slide, and the reciprocatory carriage on which it is mounted, of adjustable connections between the slides for causing their simultaneous adjustment, substantially as described.

12. The combination with two slides, a reciprocatory carriage on which one of the slides is mounted, of right and left screws connecting the slides with their supports and connections between said screws for operating them simultaneously, substantially as described.

13. The combination with the frame, the slide thereon, the reciprocatory carriage and the slide upon it, of right and left screws connecting the slides with the frame and carriage, the shaft in the frame and the chains connecting the shaft and screws, whereby the slides may be simultaneously adjusted, substantially as described.

14. In a box machine for assembling tenoned boxes, in combination with relatively movable board carriers engaging the boards inside their tenons, of the board pressers engaging the inner sides of the boards between the carriers and preventing their bending when the boxes are formed, substantially as described.

15. In a box machine for assembling tenoned boxes, the combination with board carriers engaging the board inside the tenons, of the board presser engaging the inner side of the board between the carriers and preventing its bending when the boxes are formed, substantially as described.

16. In a box machine for assembling tenoned boxes, the combination with board carriers engaging the board inside the tenons, of the movable presser engaging the inside of the board between the carriers to prevent its bending when the boxes are formed, substantially as described.

17. In a box machine for assembling tenoned boxes, the combination with a slide or abutment and board carriers thereon engaging the board inside the tenons, of a movable presser mounted on the slide engaging the inner side of the board between the carriers and a relatively movable stop cooperating with the presser for limiting its movement, substantially as described.

18. In a box machine for assembling tenoned boxes, the combination with cooperating and relatively movable slides or abutments, of board pressers arranged on the slides and engaging the inner sides of the boards, and relatively movable stops for cooperating with the pressers and limiting their movement when the slides are moved, substantially as described.

19. In a box machine for assembling tenoned boxes, the combination with cooperating and relatively movable abutments or slides having board carriers engaging the boards inside the tenons, of pressers engaging the inner sides of the boards between the carriers, springs holding the pressers normally against the boards and stops for limiting their movement against the springs, substantially as described.

20. In a box machine, the combination with two cooperating and relatively movable slides for forcing the boards into engagement, of pressers engaging the inner sides of the boards arranged on the slides and stops for engaging each presser and the opposing slide and limiting the movement of the former, substantially as described.

21. In a box machine, the combination with two cooperating and relatively movable slides for forcing the boards into engagement, one of them having two board carriers thereon, and the board presser arranged between them, of an adjustable gage between said presser and the other slide for engaging and limiting the motion of the presser, substantially as described.

22. In a box machine, the combination with four cooperating and relatively adjustable slides, each slide having two board carriers thereon and a presser arranged between them, of adjustable gages between the pressers and their opposing slides for limiting the movement of the former, substantially as described.

23. In a box machine having relatively movable and cooperating slides or abutments, the combination with one of the slides having the board carriers pivoted thereon, of the presser on the slide having the roller operating on the inner face of the board, substantially as described.

24. In a box machine, the combination with four cooperating slides or abutments, relatively movable toward each other in pairs and each having pivoted board carriers thereon, of a movable presser for each slide having a roller engaging the inner face of the board and a spring for operating the presser, substantially as described.

25. In a box machine having relatively movable and cooperating slides or abutments, the combination with one of the slides having the board carriers pivoted thereon and the board supports on the carriers, of the presser on the slide, and the spring for holding it in contact with the board, substantially as described.

26. In a box machine, the combination of a slide having board carriers thereon, a presser cooperating with the carriers to hold the board and a gage rod adjustably secured to said presser and projecting outwardly and an opposing slide or abutment adapted to engage said rod, substantially as described.

27. The combination of the slide having two board carriers thereon, a presser arranged between them, and a gage rod adjustably secured to said presser and projecting outwardly and an opposing slide or abutment adapted to engage the rod, substantially as described.

28. The combination of the slides having board carriers thereon, a presser, a spring for retracting it, an elastic stop against which it is held, and an adjustable gage rod connected to the presser and projecting outwardly and an opposing slide or abutment adapted to engage the rod, substantially as described.

29. In a box machine, the combination with the stationary slide, having the board presser and the adjustable gage rod thereon, of the movable carriage, the slide thereon, the board presser on the slide, and the adjustable gage rod cooperating with said last mentioned presser, substantially as described.

30. In a box machine, the combination with the stationary slide having the board presser and the adjustable gage rod thereon, of the movable carriage, the slide thereon, the board presser on the slide, the adjustable gage rod cooperating with the last mentioned presser and adjustable connections between the two slides, substantially as described.

31. In a box machine, the combination of two stationary and two movable slides, mechanism for operating said movable slides toward their cooperating slides and adjustable connections between one of the movable slides and its operating mechanism for varying its movement whereby the tongues on the boards may be properly engaged before the final pressure is given, substantially as described.

32. In a machine for engaging tongued boards, the combination of two slides relatively movable toward each other, a stationary slide and a cooperating movable slide and actuating mechanism for the first mentioned slides moving relatively faster to first enter the tongues on the boards and then simultaneously with the movable slide to complete the operation, substantially as described.

33. In a machine for engaging tongued boards, the combination of two slides relatively movable toward each other, a stationary slide and a cooperating movable slide, actuating mechanism, connections between said mechanism and the first mentioned slides and connections between the movable slides and said mechanism embodying a loose part, whereby said slide will be operated after the first mentioned slides have been moved a short distance, substantially as described.

34. In a machine for engaging tongued boards, the combination of two stationary and two movable slides, mechanism for operating the movable slides and an adjustable connection between one of the slides and the operating mechanism, whereby its movements may be varied relative to the other one, substantially as described.

35. In a machine for engaging tongued boards, the combination of two stationary and two movable slides, the actuating shafts having crank pins operating on the slides and an adjustable connection between one of the pins and its cooperating slide, whereby its movements may be varied relative to the other one, substantially as described.

36. In a machine for engaging tongued boards, the combination of two stationary and two movable slides, the shafts having crank pins, the pitmen connected to the slides and operated upon by the cranks and the loose and adjustable connection between one of the crank pins and its slide, substantially as described.

37. In a box machine, the combination of two stationary and two movable slides mechanism for operating said movable slides and a gage or stop for engaging the board on a movable slide when in outward position only, thus positioning it before the engagement of the boards with each other substantially as described.

38. In a box machine, the combination of two stationary and two movable slides, mechanism for operating said movable slides of a gage or stop on one of the stationary slides for engaging the board on one of the movable slides when the latter is in outward position only, thus positioning it before the engagement of the boards with each other substantially as described.

39. In a box machine of the class described, embodying means for engaging the ends of co-operating boards, a slide or support and a board carrier thereon pivoted to turn or yield laterally, whereby the carrier together with the board in contact is permitted a movement in the direction of its engagement with a co-operating board, substantially as described.

HARRY W. MORGAN.

Witnesses:
FRED F. CHURCH,
JOHN C. HAWLEY.